US012668998B2

(12) United States Patent
Bryan

(10) Patent No.: US 12,668,998 B2
(45) Date of Patent: Jun. 30, 2026

(54) HAND RESTRAINT SYSTEM

(71) Applicant: Michael Bryan, Greenville, SC (US)

(72) Inventor: Michael Bryan, Greenville, SC (US)

( * ) Notice: Subject to any disclaimer, the term of this patent is extended or adjusted under 35 U.S.C. 154(b) by 0 days.

(21) Appl. No.: 18/643,406

(22) Filed: Apr. 23, 2024

(65) Prior Publication Data

US 2025/0327341 A1 Oct. 23, 2025

(51) Int. Cl.
*E05B 75/00* (2006.01)

(52) U.S. Cl.
CPC .................................... *E05B 75/00* (2013.01)

(58) Field of Classification Search
CPC ............................... E05B 75/00; Y10T 70/404
USPC .............................................................. 70/16
See application file for complete search history.

(56) References Cited

U.S. PATENT DOCUMENTS

| | | | | |
|---|---|---|---|---|
| 691,941 | A | 1/1902 | Headson | |
| 738,983 | A | 9/1903 | Burdick | |
| 1,803,280 | A | 4/1931 | Stull et al. | |
| 2,324,183 | A | 7/1943 | Wilson | |
| 4,162,622 | A | 7/1979 | Daleo | |
| 4,949,679 | A * | 8/1990 | Wolfer | E05B 75/00 128/878 |
| 5,031,639 | A | 7/1991 | Wolfer | |
| 5,461,890 | A | 10/1995 | LeFavor | |
| 5,469,813 | A * | 11/1995 | Peden | E05B 75/00 119/770 |
| 5,551,086 | A | 9/1996 | Albanese | |
| 5,551,447 | A | 9/1996 | Hoffman et al. | |
| 5,680,781 | A | 10/1997 | Bonds et al. | |
| 5,706,679 | A | 1/1998 | Zane et al. | |
| 5,794,463 | A | 8/1998 | McDaid | |
| 5,894,748 | A | 4/1999 | Capperrune | |
| 6,026,661 | A | 2/2000 | Spiropoulos | |
| 6,334,444 | B1 | 1/2002 | Sisco | |
| 6,360,747 | B1 | 3/2002 | Velarde et al. | |
| 6,637,077 | B2 | 10/2003 | Doty | |
| 6,637,242 | B2 | 10/2003 | Masters | |
| 7,866,321 | B2 | 1/2011 | DePetrillo | |
| 9,038,426 | B2 | 5/2015 | Flynn | |
| 9,284,754 | B2 * | 3/2016 | Stevens | E05B 75/00 |
| 9,314,013 | B2 | 4/2016 | Mancuso, Jr. | |
| 9,828,791 | B2 | 11/2017 | Lash | |
| 10,036,184 | B1 | 7/2018 | Sims | |
| D850,729 | S * | 6/2019 | Fowler | D29/120.2 |
| 10,400,483 | B2 | 9/2019 | Sims | |
| 11,708,708 | B1 * | 7/2023 | Scoggin | E05B 73/0005 29/525.01 |
| 11,920,383 | B2 | 3/2024 | Bryan | |

(Continued)

FOREIGN PATENT DOCUMENTS

| | | |
|---|---|---|
| WO | WO9738194 A1 | 10/1997 |
| WO | WO2000066861 A1 | 11/2000 |
| WO | WO2006135921 A2 | 12/2006 |

*Primary Examiner* — Suzanne L Barrett
(74) *Attorney, Agent, or Firm* — Dority & Manning, P.A.

(57) ABSTRACT

A hand restraint system includes an elongated member and three handcuffs. A first handcuff of the three handcuffs is mounted to the elongated member at a first end portion of the elongated member, a second handcuff of the three handcuffs is mounted to the elongated member at a second end portion of the elongated member, and a third handcuff of the three handcuffs mounted to the elongated member at the second end portion of the elongated member.

19 Claims, 5 Drawing Sheets

(56) References Cited

U.S. PATENT DOCUMENTS

| | | | |
|---|---|---|---|
| 2002/0000109 A1 | 1/2002 | Masters | |
| 2002/0148077 A1 | 10/2002 | Thompson | |
| 2009/0205379 A1 | 8/2009 | Williams | |
| 2010/0229608 A1 | 9/2010 | Dapkins, Jr. et al. | |
| 2021/0404223 A1* | 12/2021 | Bryan | E05B 75/00 |

* cited by examiner

HAND RESTRAINT SYSTEM

FIELD OF THE INVENTION

The present subject matter relates generally to hand restraint systems or handcuffs.

BACKGROUND OF THE INVENTION

Law enforcement personnel frequently use handcuffs to secure an individual's wrists together. The handcuffs are locked on the individual's wrists and cannot be removed without a key. When secured together with handcuffs, an individual cannot move his or her wrists more than a few inches apart, making many tasks difficult or impossible. Law enforcement personnel can more easily and/or confidently control a handcuffed individual due to such restricted movement.

Known handcuffs generally work well to secure the individual's wrists when the individual's wrists are placed close together behind the individual's back. However, known handcuffs have drawbacks. For instance, an individual may be uncooperative such that properly positioning the individual's wrists for securement by handcuffs is difficult. The individual may be lying face down with his or her wrists located below his or her chest. In such a position, moving the individual's wrists to the proper location for securing with the known handcuffs can be extremely difficult and require law enforcement personnel to pry the individual's arms from beneath his or her chest, a tiresome, and potentially dangerous, situation.

BRIEF DESCRIPTION OF THE INVENTION

Aspects and advantages of the invention will be set forth in part in the following description, or may be apparent from the description, or may be learned through practice of the invention.

In an example embodiment, a hand restraint system includes an elongated member extending between a first end portion and a second end portion. A plurality of handcuffs consists of three handcuffs. A first handcuff of the three handcuffs is mounted to the elongated member at the first end portion of the elongated member. A second handcuff of the three handcuffs is mounted to the elongated member at the second end portion of the elongated member. A third handcuff of the three handcuffs is mounted to the elongated member at the second end portion of the elongated member.

In another example embodiment, a hand restraint system includes an elongated member extending between a first end portion and a second end portion. A length of the elongated member between the first end portion and the second end portion of the elongated member is no less than eight inches and no more than sixteen inches. The hand restraint system includes only three handcuffs. A first handcuff of the three handcuffs is mounted to the elongated member at the first end portion of the elongated member. A second handcuff of the three handcuffs is mounted to the elongated member at the second end portion of the elongated member. A third handcuff of the three handcuffs is mounted to the elongated member at the second end portion of the elongated member. Each of the first, second, and third handcuffs respectively includes a first strand rotatably mounted to a second strand with a hinge. The first strand of the first handcuff is attached to the elongated member at the first end portion of the elongated member. The first strand of the second handcuff is attached to the elongated member at the second end portion of the elongated member. The first strand of the third handcuff is attached to the elongated member at the second end portion of the elongated member.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
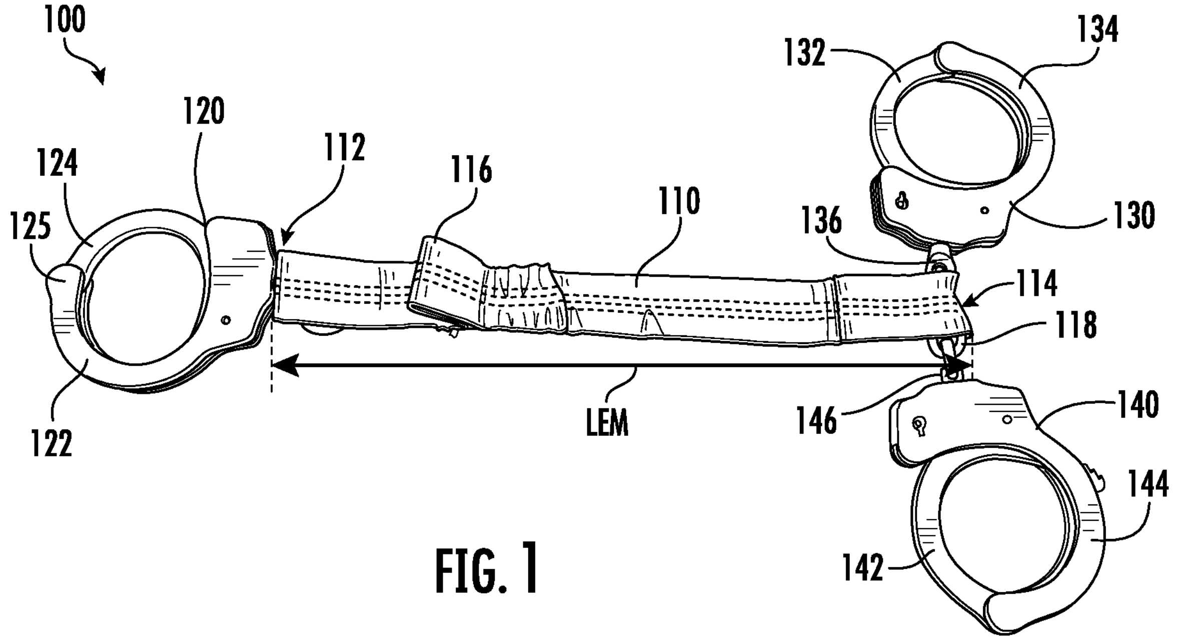
FIG. 1 is a top plan view of a hand restraint system according to an example embodiment of the present subject matter in a fully extended arrangement.

Repeat use of reference characters in the present specification and drawing is intended to represent the same or analogous features or elements of example aspects of the present invention.

DETAILED DESCRIPTION

The present subject matter generally provides a hand restraint system that provides flexibility with regards to securing the hands of individuals.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

When introducing elements of the present disclosure or the preferred embodiment(s) thereof, the articles "a", "an", "the" and "said" are intended to mean that there are one or more of the elements. As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Hand Restraint System

FIG. 1 is a top plan view of a hand restraint system 100 according to an example embodiment of the present subject matter. The restraint system 100 is configured for securing the wrists of an individual. For instance, a law enforcement official may utilize restraint system 100 to assist with an arrest or detention of the individual. The restraint system 100 may also be referred to as handcuffs. As discussed in greater detail below, the restraint system 100 may advantageously provide various options for applying the restraint system 100 to wrists of the individual. For instance, the restraint system 100 may be applied in a prying configuration (FIG. 5), in a steering configuration (FIG. 6), in a tail configuration (FIG. 7), in a retracted configuration (FIGS. 3 and 9), and other configurations. Thus, the restraint system 100 may provide a flexible system for controlling and securing an individual's wrists.

As shown in FIG. 1, the restraint system 100 includes an elongated member 110, a first handcuff 120, a second handcuff 130, and a third handcuff 140. The elongated member 110 may extend, e.g., longitudinally, between a first end portion 112 and a second end portion 114. The first handcuff 120 may be mounted to the elongated member 110, e.g., at the first end portion 112 of the elongated member 110. The second handcuff 130 may also be mounted to the elongated member 110, e.g., at the second end portion 114 of the elongated member 110. In addition, the third handcuff 140 may also be mounted to the elongated member 110, e.g., at the second end portion 114 of the elongated member 110. As may be seen from the above, the first handcuff 120 may be positioned opposite the second and third handcuffs 130, 140 on the elongated member 110. Thus, the elongated member 110 may extend longitudinally between the first handcuff 120 at one end portion of the elongated member 110 and the second and third handcuffs 130, 140 at the opposite end portion of the elongated member 110.

Figure 4:
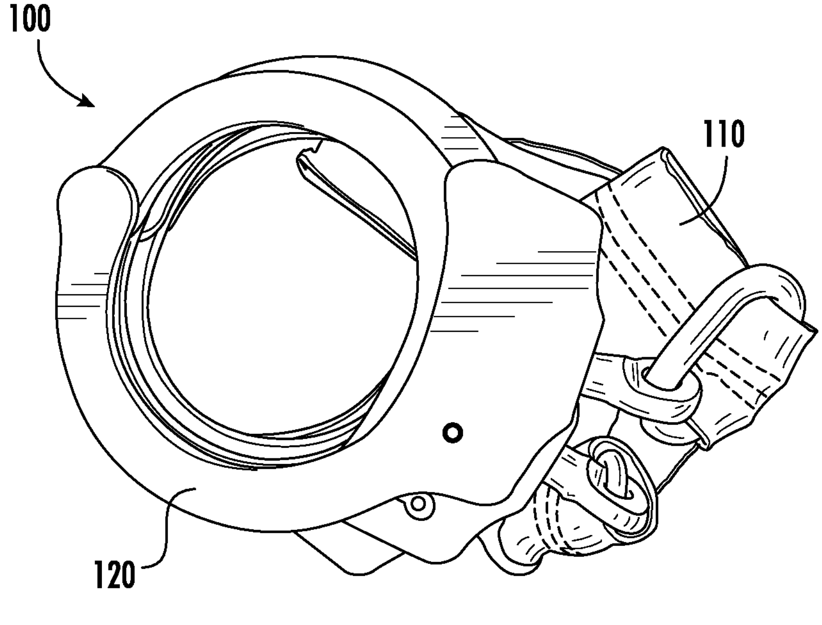
FIG. 4 is another top plan view of the example hand restraint system of FIG. 1 in a coiled arrangement.
Figure 8:
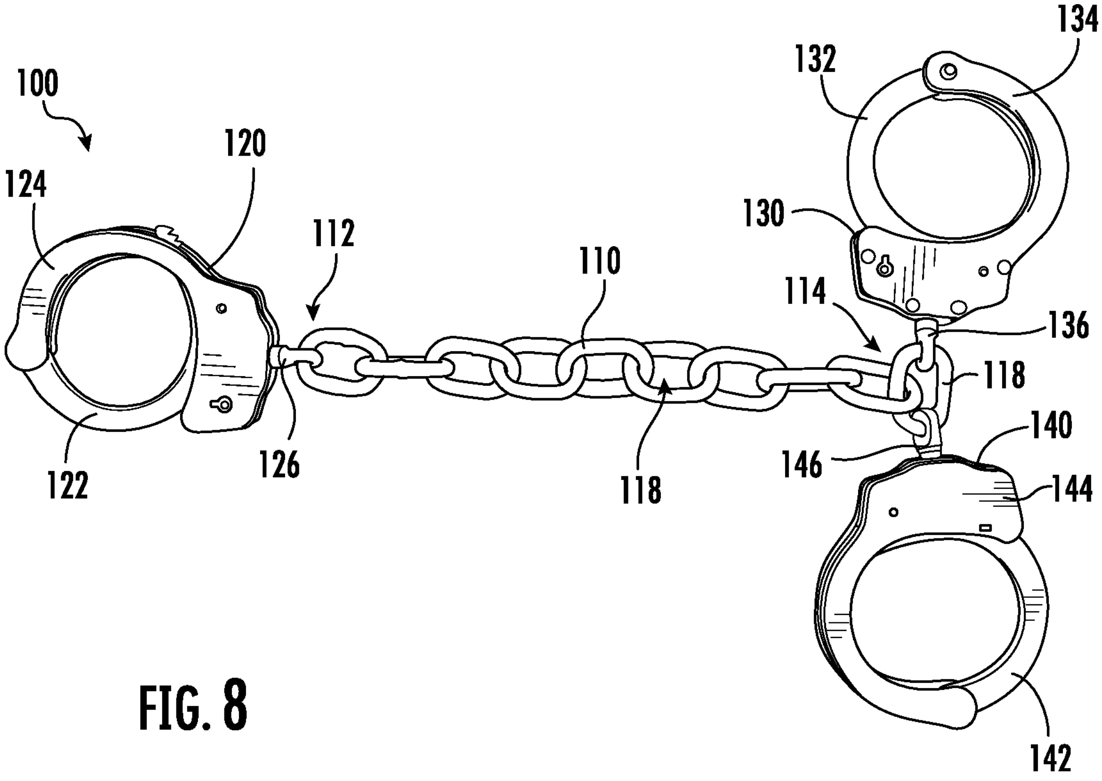
FIG. 8 is a top plan view of a hand restraint system according to another example embodiment of the present subject matter in a fully extended arrangement.

The elongated member 110 may be any suitable connector for the first, second, and third handcuffs 120, 130, 140. For instance, the elongated member 110 may be a fabric webbing as shown in FIG. 1. In alternative example embodiments, the elongated member 110 may be a chain, such as shown in FIG. 8, a cable, or other suitable elongated member. The elongated member 110 may securely and reliably connect first, second, and third handcuffs 120, 130, 140. In addition, because the elongated member 110 is flexible, elongated member 110 may advantageously coil for storage, e.g., within a handcuff holder on a belt of a law enforcement official, as shown in FIG. 4.

Figure 6:
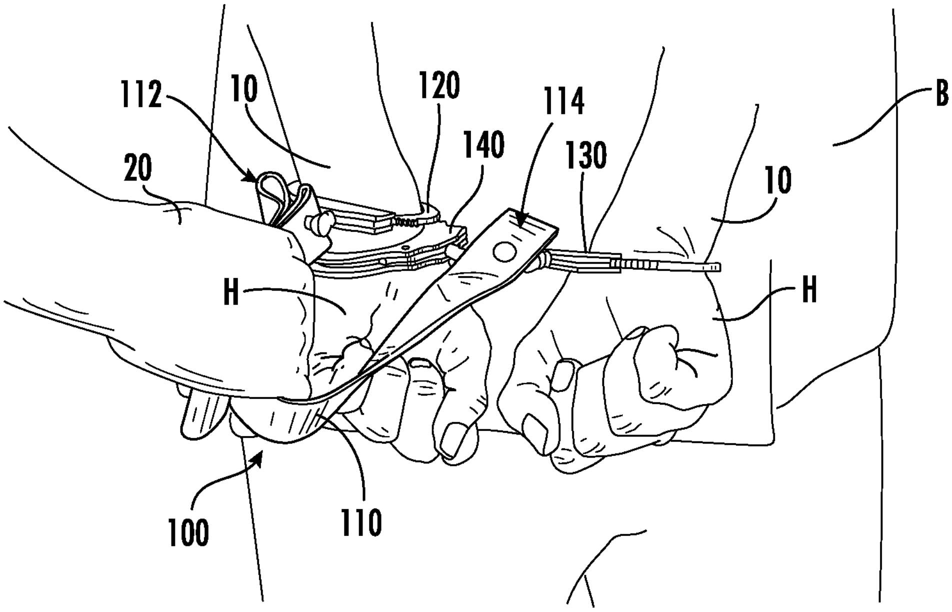
FIG. 6 is a perspective view of the example hand restraint system of FIG. 1 secured to hands in a steering configuration.
Figure 7:
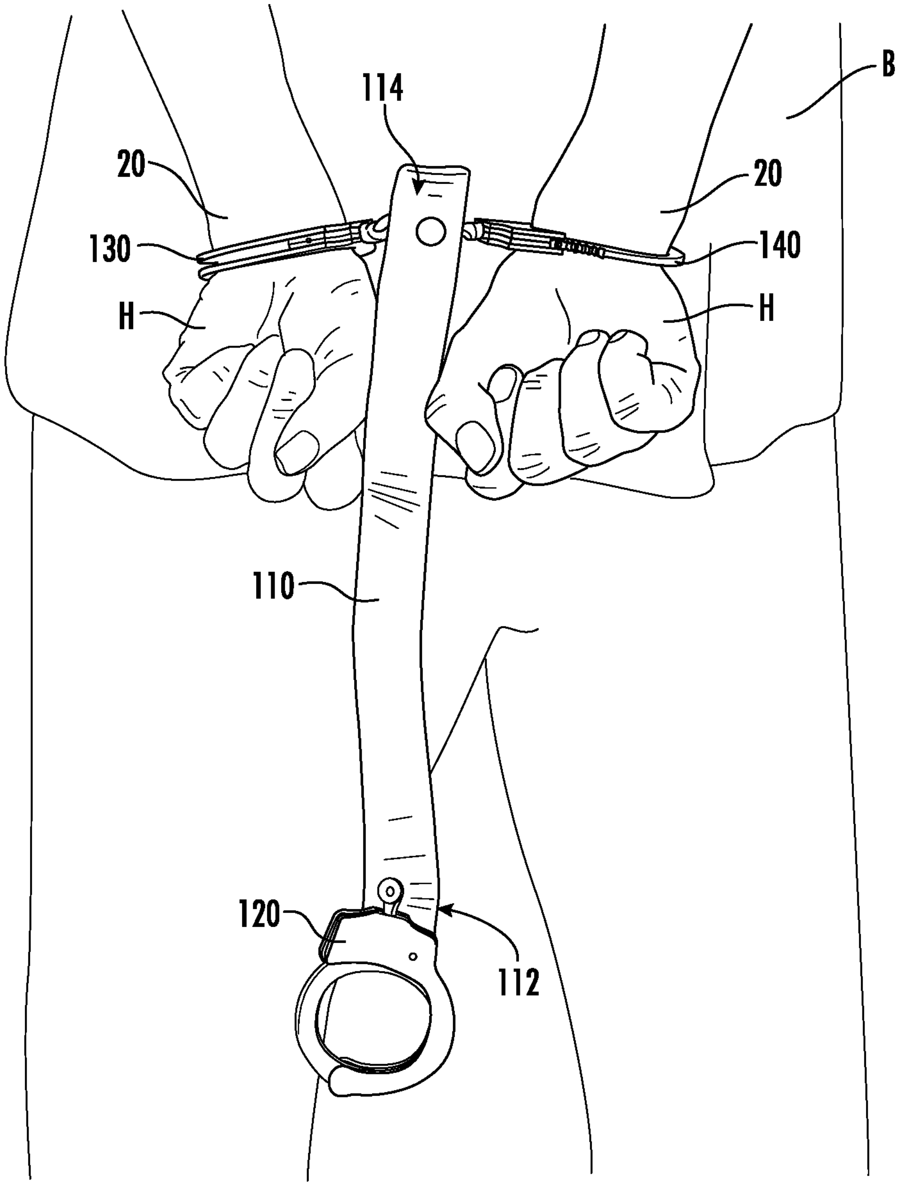
FIG. 7 is a perspective view of the example hand restraint system of FIG. 1 secured to hands in a tail configuration.

The elongated member 110 may have a length LEM between the first and second end portions 112, 114 of the elongated member 110. The length LEM of the elongated member 110 between the first and second end portions 112, 114 of the elongated member 110 may be selected to provide various options for applying the restraint system 100 to wrists of the individual. For instance, the length LEM of the elongated member 110 between the first and second end portions 112, 114 may be no less than eight inches (8") and no more than sixteen inches (16"). Such sizing of the elongated member 110 may advantageously allow use of the restraint system 100 in the prying configuration (FIG. 5), in the steering configuration (FIG. 6), and/or in the tail configuration (FIG. 7). In addition, such sizing of the elongated member 110 may advantageously allow storage of the restraint system 100, e.g., within a handcuff holder on a belt of the law enforcement official when the elongated member 110 is coiled. In contrast, leg irons are generally not carried on the belt of the law enforcement official due to the onerous size, weight, etc. of leg irons.

In the example embodiments shown in FIG. 1, the second and third handcuffs 130, 140 are connected together with a flexible coupling 118, such as a chain, link(s), a cable, a hinge, etc. A length of the flexible coupling 118 may be less than the length LEM of the elongated member 110. As an example, the length of the flexible coupling 118 may be no greater than half the length LEM of the elongated member 110. In example embodiments, the length of the flexible coupling 118 may be no less than one inch (1") and no more than three inches (3"). As an example, the second and third handcuffs 130, 140 and the flexible coupling 118 may generally correspond to a conventional set of handcuffs. The elongated member 110 may be mounted to the flexible coupling 118. For example, when the elongated member 110 is a fabric webbing as shown in FIG. 1, an end of the elongated member 110 may be wrapped around the flexible coupling 118 and stitched to another section of the elongated member 110 in order to couple the second and third handcuffs 130, 140 to the elongated member 110. As another example, when the elongated member 110 is a chain or link as shown in FIG. 8, an end link of the elongated member 110 may be connected to the flexible coupling 118 in order to couple the second and third handcuffs 130, 140 to the elongated member 110.

Figure 2:
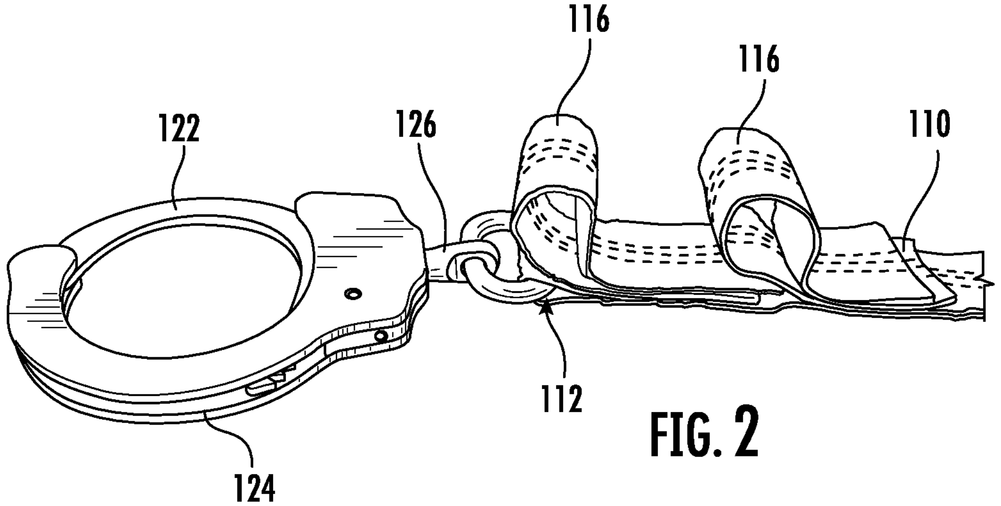
FIG. 2 is a partial side, perspective view of the example hand restraint system of FIG. 1.

The first, second, and third handcuffs 120, 130, 140 may be any suitable handcuffs. Thus, the operation and construction of the first, second, and third handcuffs 120, 130, 140 is not described in greater detail herein for the sake of brevity. However, as shown in FIGS. 1 and 2, the first handcuff 120 may generally include a first strand 122 rotatably mounted to a second strand 124 with a hinge 125. When the first handcuff 120 is open, the first strand 122 may be rotated relative to the second strand 124 on the hinge 125 such that an opening is formed between first and second strands 122, 124 and an interior of the first handcuff 120 is open. Thus, a wrist of an individual may be inserted through the opening between the first and second strands 122, 124 into the interior of the first handcuff 120 when the first handcuff 120 is open. Conversely, as shown in FIG. 1, when the first handcuff 120 is closed, the first strand 122 may be rotated relative to the second strand 124 such that the first and second strands 122, 124 overlap and the interior of first handcuff 120 is closed. Thus, the wrist of the individual between the first and second strands 122, 124 within the interior of the first handcuff 120 may be held by the first handcuff 120 due to interference with the first and second strands 122, 124 when the first handcuff 120 is closed.

When the first handcuff 120 is closed, rotation of first and second strands 122, 124 towards the open configuration of the first handcuff 120 may be prevented by a lock within the first handcuff 120. For instance, ratchet teeth on the first strand 122 may engage a locking pawl (not shown) within the second strand 124 to prevent retraction of the first strand 122 from the second strand 124. A key may be used to release the locking pawl and allow the first handcuff 120 to open.

The first handcuff 120 may also include a swivel 126. When the elongated member 110 is a fabric webbing as shown in FIG. 1, an end of the elongated member 110 may be wrapped around the swivel 126 and/or a link connected to the swivel 126 and stitched to another section of the elongated member 110 in order to couple the first handcuff 120 to the elongated member 110. As another example, when the elongated member 110 is a chain or link as shown in FIG. 8, an end link of the elongated member 110 may be connected to the swivel 126 in order to couple the first handcuff 120 to the elongated member 110. The first handcuff 120 may be rotatable relative to the elongated member 110 via the swivel 126.

The second handcuff 130 and/or the third handcuff 140 may be constructed in the same or similar manner to the first handcuff 120. Thus, the description of the first handcuff 120 above is equally applicable to the second handcuff 130, and repetitive description of the second handcuff 130 is omitted for the sake of brevity. Similarly, the description of the first handcuff 120 above is equally applicable to the third handcuff 140, and repetitive description of the third handcuff 140 is omitted for the sake of brevity. For example, the second handcuff 130 may have a first strand 132 and a second strand 134, and the third handcuff 140 may have a first strand 142 and a second strand 144. The second and third handcuffs 130, 140 may be rotatable relative to the elongated member 110 via a respective swivel 136, 146, e.g., to which the flexible coupling 118 are connected.

The restraint system 100 may include only three handcuffs, namely the first, second, and third handcuffs 120, 130, 140. Thus, only the first, second, and third handcuffs 120, 130, 140 may be mounted to the elongated member 110, and no fourth handcuff may be mounted to the elongated member 110 in the restraint system 100 such that the restraint system 100 includes exactly three (and no more) handcuffs. Thus, e.g., the restraint system 100 may not be suitable for prison transfer, may not include a belt, may not include a belly chain, may not include leg cuffs, etc. As may be seen from the above, the restraint system 100 may be a simple system that includes the elongated member 110, the first handcuff 120, the second handcuff 130, and the third handcuff 140 and no or limited additional components.

Figure 3:
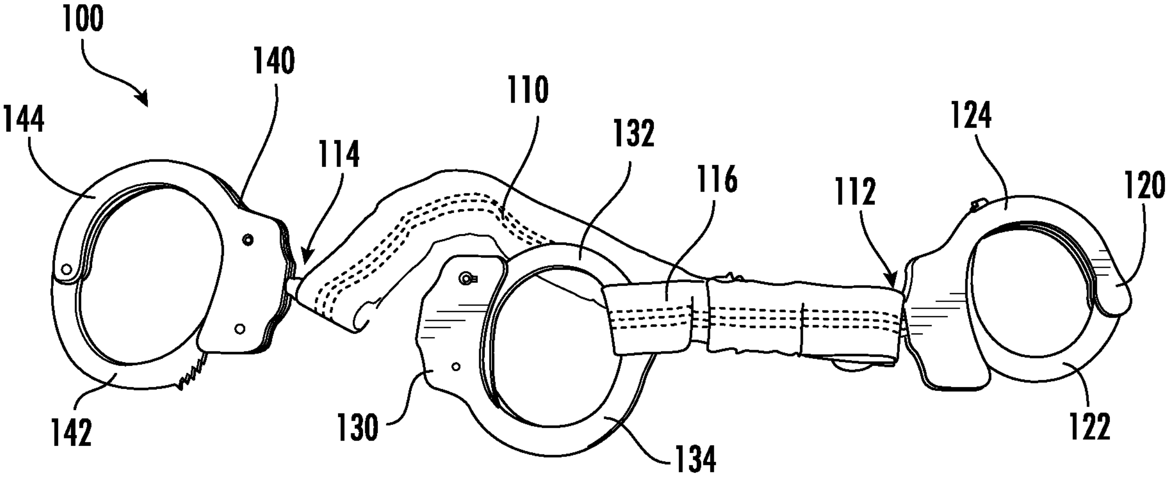
FIG. 3 is another top plan view of the example hand restraint system of FIG. 1 in a retracted arrangement.
Figure 5:
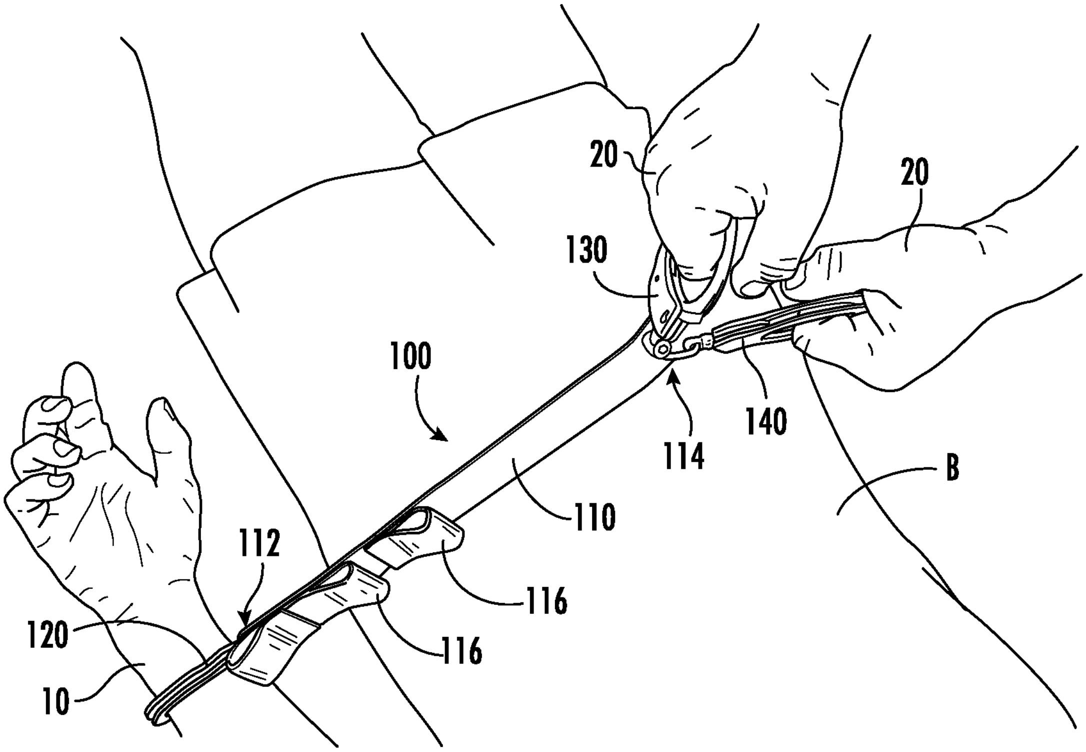
FIG. 5 is a perspective view of the example hand restraint system of FIG. 1 secured to a hand in a prying configuration.
Figure 9:
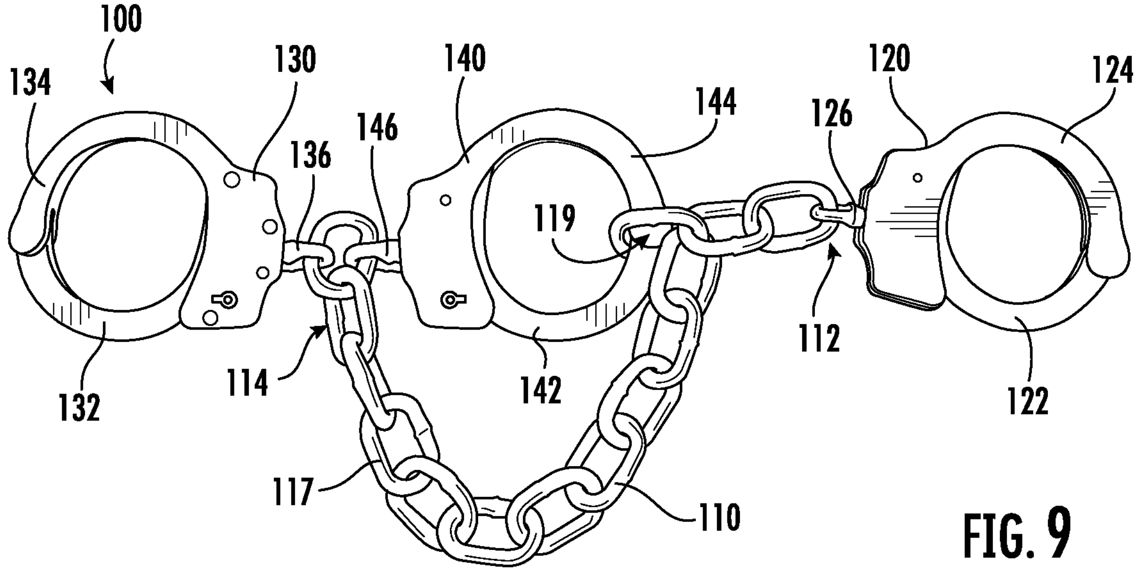
FIG. 9 is another top plan view of the example hand restraint system of FIG. 8 in a retracted arrangement.

The first, second, and third handcuffs 120, 130, 140 may each be applied or positioned on a wrist of an individual. By providing three handcuffs, a user may have various options for applying the restraint system 100 to wrists of the individual. Moreover, the restraint system 100 may be applied in a prying configuration as shown in FIG. 5, in a steering configuration as shown in FIG. 6, in a tail configuration as shown in FIG. 7, and/or in a retracted configuration as shown in FIGS. 3 and 9. Thus, the restraint system 100 may provide a flexible system for controlling and securing an individual's wrists.

Prying Configuration

The restraint system 100 includes features for assisting with moving the wrists of an individual, for instance from below the individual when the individual is lying facedown on the ground with his or her wrists positioned under the individual. Such features are described in greater detail below in the context of FIG. 5.

As shown in FIG. 5, the restraint system 100 may be applied in the prying configuration. For instance, a law enforcement official may lock the first handcuff 120 on one wrist of the individual. When the individual with a body B is lying facedown with a hand H positioned beneath the body B or next to the body B, moving the hand H from next to or below the body B can be difficult for the law enforcement official. In particular, the law enforcement official may have difficulty with simultaneously grasping the hand H and getting leverage to pull the hand H from under or next to the body B. It can be particularly difficult and/or potentially dangerous for the law enforcement official to remove the individual's hand(s) from next to or below the body B and reposition the hand(s) on the individual's back where conventional handcuffs can restrain the individual's hand(s).

To assist in the above and similar situations, the restraint system 100 includes the second and third handcuffs 130, 140. A law enforcement official may pull on one or both of the second and third handcuffs 130, 140 in order to assist with moving a wrist of secured by the first handcuff 120. For example, the law enforcement official may grasp the second and third handcuffs 130, 140 in order to use the second and third handcuffs 130, 140 as handles for the pulling the first handcuff 120 via the elongated member 110. The elongated member 110 may couple or connect the first, second, and third handcuffs 120, 130, 140. For instance, the elongated member 110 may limit a distance by which the first handcuff 120 may move relative to the second and third handcuffs 130, 140. Thus, pulling force applied by the law enforcement official may be transferred from the second and third handcuffs 130, 140 through the elongated member 110 to the first handcuff 120 on a wrist of an individual, e.g., in order to move the wrist to a desired location without requiring the law enforcement official to directly grasp and pull on the wrist, which may be located at a difficult position. Moreover, the sizing of the elongated member 110 may advantageously allow securing of the first handcuff 120 on a wrist of an individual while the second and third handcuffs 130, 140 may be located in an area easily graspable by a law enforcement official for use as handles.

Without the restraint system 100, the law enforcement official would generally be required to grasp the individual's wrist below the body B and with great exertion wrestle the hand H from the underside of the body B or beside the body B to the back of the individual while constantly grasping the individual's wrist. The restraint system 100 provides the law enforcement official with a convenient place to grasp and allows the law enforcement official to apply the required force to move the hand H more easily and/or with greater leverage.

Steering Configuration

The restraint system 100 also includes features for assisting with steering an individual, for instance while walking the individual from one location to another. Such features are described in greater detail below in the context of FIG. 6.

As shown in FIG. 6, the restraint system 100 may be applied in the steering configuration. For instance, a law enforcement official may lock the second handcuff 130 on one wrist of the individual and lock the first and third handcuffs 120, 140 on the other wrist of the individual. In another arrangement, the law enforcement official may lock the first and second handcuffs 130, 140 on one wrist of the individual and lock the third handcuff 140 on the other wrist of the individual. Thus, e.g., after repositioning the wrist of the individual using the prying configuration, in which the second and third handcuffs 130, 140 may be used as handles, the second and third handcuffs 130, 140 may be secured on opposite wrists of the individual. The law enforcement official then grasp the elongated member 110 (e.g., and coil or loop the elongated member 110), and the law enforcement official may use the elongated member 110 as a handle to steer the individual to a desired location while the wrists of the individual are secured together with the second and third handcuffs 130, 140.

The steering configuration may be implemented after the prying configuration to move the individual to the desired location while the restraint system 100 helps the law enforcement official maintain control of the individual. It will be understood that the steering configuration may also be implemented from other arrangements of the restraint system 100.

As noted above, the flexible coupling 118 may connect the second and third handcuffs 130, 140 together. Moreover, the flexible coupling 118 may limit or prevent separation of the second and third handcuffs 130, 140. In example embodiments, the second and third handcuffs 130, 140 may collectively function as a conventional set of handcuffs when locked on the wrists of the individual. The flexible coupling 118 may limit movement of the second handcuff 130 relative to the third handcuff 140 in the steering configuration, which can assist with restraining the individual such that the individual cannot move his or her wrists more than a few inches apart.

Tail Configuration

The restraint system 100 also includes features for assisting with securing an individual, for instance while holding the individual at a particular location. Such features are described in greater detail below in the context of FIG. 7.

As shown in FIG. 7, the restraint system 100 may be applied in the tail configuration. For instance, a law enforcement official may lock the second handcuff 130 on one wrist of the individual and lock the third handcuff 140 on the other wrist of the individual. Thus, e.g., after repositioning the wrist of the individual using the prying configuration, in which the second and third handcuffs 130, 140 may be used as handles, the second and third handcuffs 130, 140 may be secured to opposite wrists of the individual. With the second and third handcuffs 130, 140 secured to the wrists of the individual, the first handcuff 120 may be removed from the individual and secured to another fixture. For example, the law enforcement official may secure the first handcuff 120 to a police cruiser, a chair, etc. to limit movement of the individual away from the fixture and keep the individual at a desired location while the wrists of the individual are secured together with the second and third handcuffs 130, 140.

Thus, the tail configuration may be implemented after the prying configuration to keep the individual at the desired location while the restraint system 100 helps the law enforcement official maintain control of the individual. It will be understood that the tail configuration may also be implemented from other arrangements of the restraint system 100.

Again, the flexible coupling 118 may connect the second and third handcuffs 130, 140 together. Moreover, the flexible coupling 118 may limit or prevent separation of the second and third handcuffs 130, 140. The flexible coupling 118 may limit movement of the second handcuff 130 relative to the third handcuff 140 in the tail configuration, which can assist with restraining the individual such that the individual cannot move his or her wrists more than a few inches apart.

Retracted Configuration

The restraint system 100 may also include features for assisting with securing an individual, for instance with a large torso or waist. Such features are described in greater detail below in the context of FIGS. 3 and 9.

As shown in FIGS. 3 and 9, the restraint system 100 may be applied in a retracted configuration. For instance, a law enforcement official may lock the first handcuff 120 on one wrist of the individual and lock the second or third handcuff 130, 140 on the other wrist of the individual. Thus, e.g., after repositioning the wrist of the individual using the prying configuration, in which the second and third handcuffs 130, 140 may be used as handles, the third handcuff 140 may be secured to an opposite wrist of the individual relative to the first handcuff 120. With the first and second 120, 130 secured to the wrists of the individual, the third handcuff 140 may be secured to the elongated member 110 to shorten an effective length of the elongated member 110 that corresponds to the distance that the first and second 120, 130 may displace relative to each other.

With reference to FIG. 3, the elongated member 110 may include one or more loops 116. For instance, elongated member 110 may include one, two, three, four, or more loops 116. The loops may be disposed between the first and second end portions 112, 114 of the elongated member 110. In example embodiments, the loops 116 may be (e.g., uniformly) spaced apart from one another on the elongated member 110 between the first and second end portions 112, 114 of the elongated member 110. The second or third handcuff 130, 140 may be secured to the elongated member 110 at the loops 116. For instance, the loops 116 may be sized such that a strand (e.g., the first strand 132 of the second handcuff 130 and/or the first strand 142 of the third handcuff 140) is extendable through the loops 116 of the elongated member 110. With the second or third handcuff 130, 140 secured to the elongated member 110 at one of the loops 116, the effective length of the elongated member 110 may be less than the length LEM of the elongated member 110 between the first and second end portions 112, 114. For example, the effective length of the elongated member 110 (e.g., that the first handcuff may displace away from the one of the second and third handcuff 130, 140 not secured to the elongated member 110 at the loops 116) may be no less than three inches (3") and no more than twelve inches (12").

With reference to FIG. 9, the elongated member 110 may include links 117, and one or more (e.g., each) of the links 117 may have an open inner area 119. The second or third handcuff 130, 140 may be secured to the elongated member 110 at the links 117. For instance, the inner area 119 of the links 117 may be sized such that a strand (e.g., the first strand 132 of the second handcuff 130 and/or the first strand 142 of the third handcuff 140) is extendable through the inner area 119 of the links 117 on the elongated member 110. With the second or third handcuff 130, 140 secured to the elongated member 110 at the inner area 119 of the links 117, the effective length of the elongated member 110 may be less than the length LEM of the elongated member 110 between the first and second end portions 112, 114. For example, the effective length of the elongated member 110 (e.g., that the first handcuff may displace away from the one of the second and third handcuff 130, 140 not secured to the elongated member 110 at the loops 116) may be no less than three inches (3") and no more than twelve inches (12").

The retracted configuration may be implemented after the prying configuration to secure large individuals. For instance, the elongated member 110 may provide a greater length between handcuffs secured to the wrists of the individuals than the steering configuration or the tail configuration, e.g., in which movement of the wrists of the individual are limited by the flexible coupling 118. It will be understood that the retracted configuration may also be implemented from other arrangements of the restraint system 100.

Jumbo Configuration

The restraint system 100 may also include features for assisting with securing very large individuals. Such features are described in greater detail below in the context of FIG. 1.

The restraint system 100 may be applied in a jumbo configuration to assist with securing very large individuals. For instance, a law enforcement official may lock the first handcuff 120 on one wrist of the individual and lock the second and/or third handcuff 130, 140 on the other wrist of the individual. Thus, e.g., after repositioning the wrist of the individual using the prying configuration, in which the second and third handcuffs 130, 140 as handles, the second and/or third handcuffs 130, 140 may be secured to an opposite wrist of the individual relative to the first handcuff 120.

With the first handcuff 120 on one wrist of the individual and the second and/or third handcuff 130, 140 on the other wrist of the individual, the effective length of the elongated member 110 may correspond to the length LEM of the elongated member 110 between the first and second end portions 112, 114. For example, the effective length of the elongated member 110 (e.g., that the first handcuff may displace away from the one of the second and third handcuffs 130, 140) may be no less than eight inches (8") and no more than sixteen inches (16").

The jumbo configuration may be implemented after the prying configuration to secure very large (e.g., obese) individuals. For instance, the elongated member 110 may provide a greater length between handcuffs secured to the wrists of the individuals than the steering configuration, the tail configuration, and the retracted configuration. It will be understood that the jumbo configuration may also be implemented from other arrangements of the restraint system 100.

Coiled Configuration

The restraint system 100 may also include features for assisting with storing the restraint system 100. Such features are described in greater detail below in the context of FIG. 4.

When not in use, the restraint system 100 may be arranged in the coiled configuration. For instance, a law enforcement official may align the first, second, and third handcuffs 120, 130, 140, e.g., such that the interiors of the first, second, and third handcuffs 120, 130, 140 between the strands of the first, second, and third handcuffs 120, 130, 140 are aligned. The elongated member 110 may also be coiled or folded, e.g., with the first, second, and third handcuffs 120, 130, 140. In the coiled configuration, the restraint system 100 may be disposed within a handcuff holder on a belt of the law enforcement official.

The restraint system 100 may be arranged to occupy a small volume in the coiled configuration. For instance, a total volume occupied by the restraint system 100 may be no greater than thirty cubic inches (30 $in^3$). Thus, the restraint system 100 may be sized for storage on a belt of the law enforcement official.

As may be seen from the above, the restraint system 100 is a useful tool for a law enforcement official, and restraint system 100 may assist the law enforcement official with safely and quickly restraining non-compliant individuals. Restraint system 100 may be conveniently carried on a belt of the law enforcement official, e.g., as a supplement to a conventional set of handcuffs.

The handcuffs of the restraint system 100 may each be applied or positioned in a variety of configurations to provide a flexible system for controlling and securing an individual's wrists. For instance, the three handcuffs may be applied in one of a prying configuration, a steering configuration, and a tail configuration. Each of these configurations can assist a law enforcement office with securing an individual in a respective situation, as described above. The restraint system 100 may also include features that assist with securing individuals of various sizes, including large individuals that are not easily secured with conventional handcuffs. The restraint system 100 may be coiled and sized for storage on a belt of the law enforcement official.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A hand restraint system, comprising:

an elongated member extending between a first end portion and a second end portion, a length of the elongated member between the first end portion and the second end portion of the elongated member being no less than eight inches and no more than sixteen inches; and a plurality of handcuffs consisting of three handcuffs, a first handcuff of the three handcuffs mounted to the elongated member at the first end portion of the elongated member, a second handcuff of the three handcuffs mounted to the elongated member at the second end portion of the elongated member, and a third handcuff of the three handcuffs mounted to the elongated member at the second end portion of the elongated member, wherein each of the first, second, and third handcuffs respectively comprise a first strand rotatably mounted to a second strand with a hinge.

2. The hand restraint system of claim 1, wherein the elongated member comprises a chain.

3. The hand restraint system of claim 2, wherein an inner area of one or more links of the chain is sized such that one or both of a strand of the second handcuff and a strand of the third handcuff is extendable through the inner area of one or more links of the chain.

4. The hand restraint system of claim 1, wherein the elongated member comprises a webbing.

5. The hand restraint system of claim 4, wherein the webbing comprises a plurality of loops spaced apart on the webbing between the first and second end portions of the elongated member, the loops sized such that one or both of a strand of the second handcuff and a strand of the third handcuff is extendable through the loops of the webbing.

6. The hand restraint system of claim 1, wherein a swivel of the second handcuff is coupled to a swivel of the third handcuff such that a spacing between the swivels of the second and third handcuffs is no greater than three inches.

7. The hand restraint system of claim 6, wherein a swivel of the first handcuff is coupled to a swivel of the second handcuff such that a spacing between the first and second handcuffs is no greater than sixteen inches.

8. The hand restraint system of claim 1, wherein:

the first strand of the first handcuff is attached to the elongated member at the first end portion of the elongated member;

the first strand of the second handcuff is attached to the elongated member at the second end portion of the elongated member; and the first strand of the third handcuff is attached to the elongated member at the second end portion of the elongated member.

9. The hand restraint system of claim 8, wherein:

each of the first, second, and third handcuffs respectively comprise a swivel on the first strand;

the first end portion of the elongated member is attached to the first strand of the first handcuff at the swivel of the first handcuff;

the second end portion of the elongated member is attached to the first strand of the second handcuff at the swivel of the second handcuff; and the second end portion of the elongated member is attached to the first strand of the third handcuff at the swivel of the third handcuff.

10. The hand restraint system of claim 1, wherein the elongated member is flexible and the hand restraint system is sized such that the hand restraint system is coilable for storage within a belt worn handcuff holder.

11. A hand restraint system, comprising:

an elongated member extending between a first end portion and a second end portion, a length of the elongated member between the first end portion and the second end portion of the elongated member being no less than eight inches and no more than sixteen inches; and wherein the hand restraint system includes only three handcuffs, a first handcuff of the three handcuffs mounted to the elongated member at the first end portion of the elongated member, a second handcuff of the three handcuffs mounted to the elongated member at the second end portion of the elongated member, and a third handcuff of the three handcuffs mounted to the elongated member at the second end portion of the elongated member, wherein each of the first, second, and third handcuffs respectively comprise a first strand rotatably mounted to a second strand with a hinge, the first strand of the first handcuff is attached to the elongated member at the first end portion of the elongated member, the first strand of the second handcuff is attached to the elongated member at the second end portion of the elongated member, and the first strand of the third handcuff is attached to the elongated member at the second end portion of the elongated member.

12. The hand restraint system of claim 11, wherein the elongated member comprises a chain.

13. The hand restraint system of claim 12, wherein an inner area of one or more links of the chain is sized such that one or both of a strand of the second handcuff and a strand of the third handcuff is extendable through the inner area of one or more links of the chain.

14. The hand restraint system of claim 11, wherein the elongated member comprises a webbing.

15. The hand restraint system of claim 14, wherein the webbing comprises a plurality of loops spaced apart on the webbing between the first and second end portions of the elongated member, the loops sized such that one or both of a strand of the second handcuff and a strand of the third handcuff is extendable through the loops of the webbing.

16. The hand restraint system of claim 11, wherein a swivel of the second handcuff is coupled to a swivel of the third handcuff such that a spacing between the second and third handcuffs is no greater than three inches.

17. The hand restraint system of claim 11, wherein:

each of the first, second, and third handcuffs respectively comprise a swivel on the first strand;

the first end portion of the elongated member is attached to the first strand of the first handcuff at the swivel of the first handcuff;

the second end portion of the elongated member is attached to the first strand of the second handcuff at the swivel of the second handcuff; and the second end portion of the elongated member is attached to the first strand of the third handcuff at the swivel of the third handcuff.

18. The hand restraint system of claim 16, wherein the swivel of the first handcuff is coupled to the swivel of the second handcuff such that a spacing between the swivels of the first and second handcuffs is no greater than sixteen inches.

19. The hand restraint system of claim 11, wherein the elongated member is flexible and the hand restraint system is sized such that the hand restraint system is coilable for storage within a belt worn handcuff holder.

* * * * *